May 16, 1967 L. GRYK 3,320,606

CODE CONVERTERS

Original Filed March 4, 1964

2 Sheets-Sheet 1

INVENTOR
LEON GRYK

BY Thomas J. Ross
Joseph R. Spalla
ATTORNEYS

May 16, 1967 L. GRYK 3,320,606

CODE CONVERTERS

Original Filed March 4, 1964 2 Sheets-Sheet 2

United States Patent Office 3,320,606
Patented May 16, 1967

3,320,606
CODE CONVERTERS

Leon Gryk, New Britain, Conn., assignor, by mesne assignments, to Royal Typewriter Company, Inc., New York, N.Y., a corporation of Delaware Continuation of application Ser. No. 349,422, Mar. 4, 1964. This application Nov. 16, 1966, Ser. No. 596,716
8 Claims. (Cl. 340—347)

Figure 1:
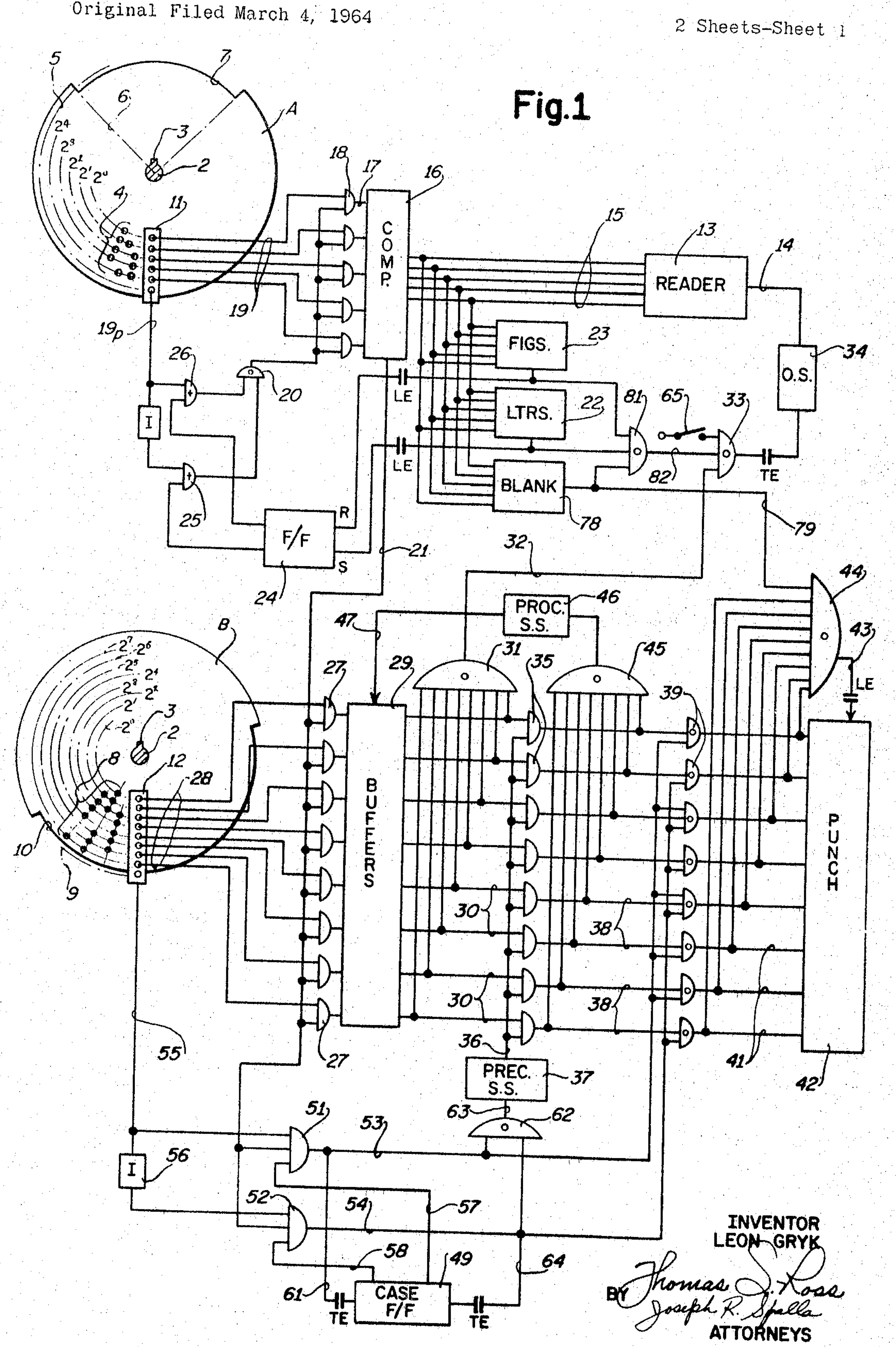

This invention relates to code converters; more particularly it relates to apparatus for converting first system codes into corresponding second systems codes characterized by its ability to automatically generate second system precedence codes in a facile manner.

Data processing systems generally employ binary codes to represent information. Since the number of combinations possible in an $n$ bit code is $2^n$ it has been the practice to employ two of the possible $2^n$ combinations as precedence codes thereby to permit the use of each of the remaining $2^n-2$ combinations to designate two different characters. For example, codes following one of the precedence codes might represent lower case information on a typewriter keyboard and the same codes following the other precedence code might represent upper case information on the typewriter keyboard. The difficulty in providing apparatus for converting first system codes to second system codes, aside from the fact that many systems do not employ the same code assignment for a particular character, resides in the fact that lower case information in one system is likely to be upper case information in another system. Accordingly systems for converting first system codes to second system codes heretofore advanced accommodated to above difficulty only with complex and expensive circuitry.

In accordance with the present invention the above difficulty is accommodated by simple and inexpensive apparatus which permits of the conversion of codes of any one system to codes of any of several other systems by the simple expedient of changing records in which first system codes to be converted and corresponding codes of a second system to which the first system codes are to be converted are prerecorded.

Broadly, in accordance with the invention circuitry is provided to compare for coincidence input and sensed prerecorded first system codes, to sense and store during the coincidence interval the prerecorded second system code corresponding to the coincident first system code, to thereafter determine from the prerecorded medium the precedence or case assignment of the character represented by the stored second system code whereby if no precedence change is dictated the stored second system code may be read out for reproduction or when a precedence change is dictated to generate a precedence code for reproduction and then read out the stored second system code.

An object of the invention is to provide a code to code converter with provision for generating precedence codes in a facile manner.

Another object of the invention is in the provision of a code to code converter employing prerecorded records containing codes to be converted and codes to which said first codes are to be converted whereby any code system may be converted to any other code system simply by changing records.

A further object of the invention is in the provision of a code to code converter whereby any code system may be converted to any other code system at high speeds.

A further object of the invention is to provide a code to code converter which is capable of converting first system codes to second system codes wherein character code assignments as well as upper and lower case character assignments differ.

A still further object of the invention is in the provision of a code to code converter employing records having prerecorded thereon codes to be converted and other codes to which said first codes are to be converted, said prerecorded other codes being accompanied by prerecorded precedence information.

Still another object of the invention is in the provision of a code to code converter wherein coincidence of input and prerecorded first system codes enable the readout of corresponding prerecorded second system codes and the generation of second system precedence codes where necessary.

Figure 2:
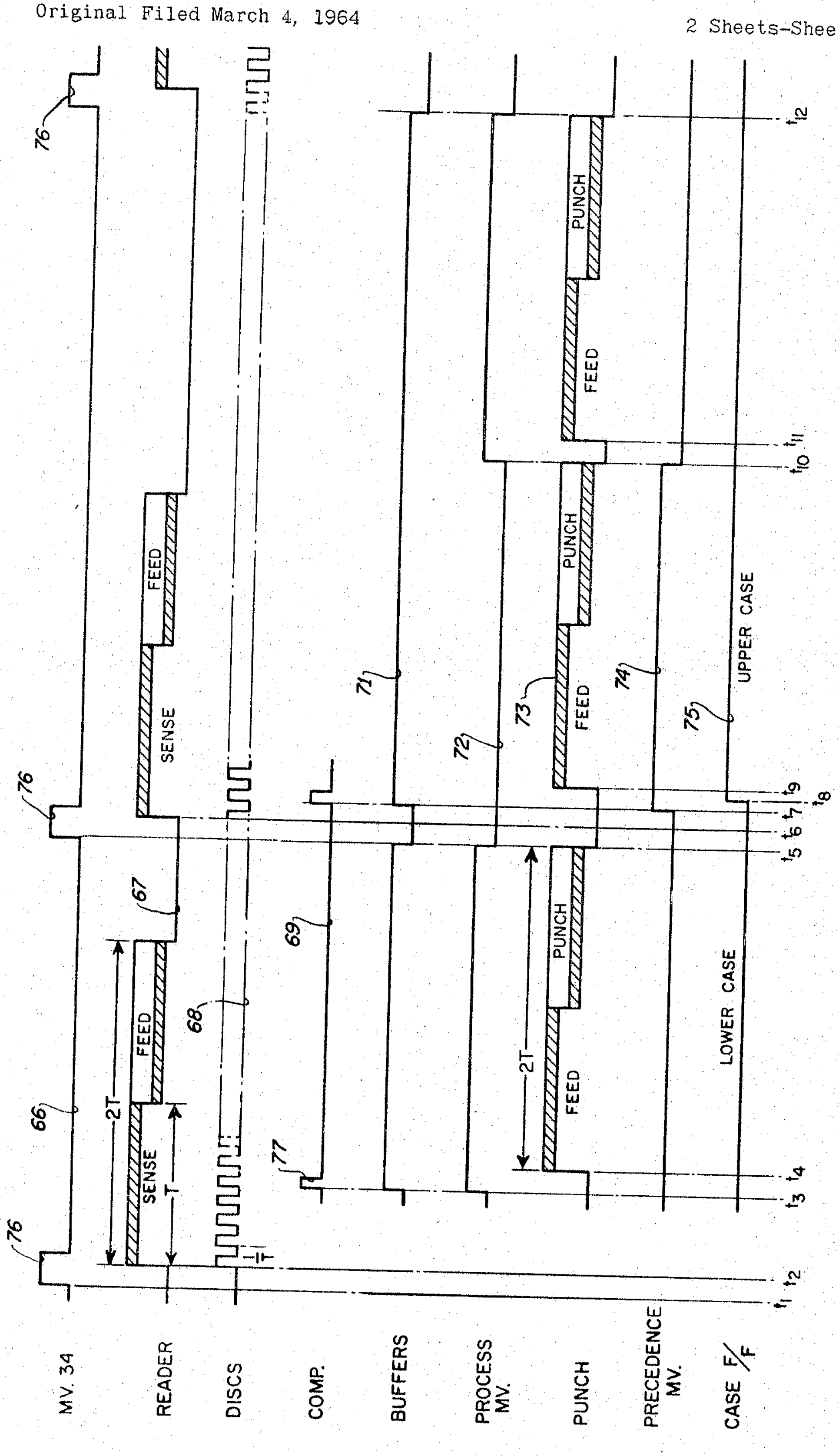

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a schematic block diagram of a preferred embodiment of a code converter in accordance with the invention employing two prerecorded discs; and FIGURE 2 is a timing diagram explanatory of the operation of the FIGURE 1 logic circuitry.

Referring now to the drawings wherein like reference characters designate like or corresponding elements throughout the several views there is shown in FIGURE 1 disc records A and B. The discs are adapted to be synchronously driven, and to this end they may be mounted in axially spaced relation on a motor driven shaft 2; the shaft being provided with a spline 3 and the discs with complementary keyways whereby the discs are driven in fixed orientation relative to one another.

Disc A has prerecorded therein, as by perforating along radial lines, parallel bit code patterns 4 representing all of the characters of and in accordance with a first system code assignment. The bits of the codes are recorded in parallel circular bit tracks designated $2^0$, $2^1$, $2^2$ . . . $2^n$.

Due to the fact that identical code paterns are, in most systems, employed to represent two different characters, i.e. an upper and a lower case character, and are distinguishable by type basket operating case precedence or letters and figures precedence codes, in order to represent all of the first system characters requires that each dual meaning first system code be recorded twice in the disc A. In accordance with the invention identical code patterns recorded on the disc A are distinguishable by the presence or absence of a hole accompanying the code patterns in a precedence or case designator track 5. As viewed in FIGURE 1 upper case character representative or "Figures" codes are grouped in a sector 6 and identical lower case character representative or "Letters" codes in the remaining disc area, thereby to simplify the recording of case precedence designator holes by permitting a peripheral portion 7 to be cut away from the upper case or Figures sector 6 of the disc. Machine function code patterns such as carriage return, space, etc., which have no case will be recorded in both Letters and Figures sector. This arrangement permits, as will hereinafter appear, the problem of the ambiguity of identical first system code patterns to be resolved.

Similarly disc B has prerecorded therein parallel bit code patterns 8 representing corresponding characters of and in accordance with a second system code assignment.

The code patterns 4 and 8 are recorded on the disc such that code patterns representing the same character information have the same angular orientation relative to a reference such as the keyways.

In accordance with the invention the precedence assignment of the character represented by each code pattern 8 on the disc B must be machine recognizable, accordingly code patterns representing upper and lower case characters are distinguished by case designators represented by the presence and absence of holes in a precedence or case designator track 9. As with disc A and as shown in FIGURE 1, rather than recording a hole with each code pattern representing an upper case character, all upper case character code patterns are preferably grouped together on the disc B so that a peripheral arcuate portion 10 coextensive with the area containing these code patterns may be cut away thus simplifying the recording of the recognizable precedence or case designator holes. The uncut peripheral portion designating lower case character code patterns, together with the cut away portion, constituting the precedence designator track 9.

Associated with discs A and B are transducer assemblies 11 and 12 respectively adapted to sense the perforated code patterns on the discs and also to sense the precedence or case holes in tracks 5 and 9 on discs A and B.

Transducer assemblies suitable for sensing hole patterns may comprise light sources on one side of the discs and light responsive cells arrayed on the other side of the discs opposite each track. The transducer assemblies will be positioned such that each simultaneously reads a code on its corresponding disc representing the same character.

In accordane with the invention code signal patterns of one system that are to be converted and which are usually stored in a tape may be supplied to the code converter by a tape reader and corresponding second system codes may be reproduced in a second tape by a record perforator.

A conventional tape reader generally designated by reference numeral 13, which responds to a true signal on tion 10 coextensive with the area containing these code a command line 14 may be employed in conjunction with the code converter of the invention. Signals will be designated true or false herein, the former being those which initiate a desired operation of a circuit element; the latter being the opposite. True and false signals may be positive or negative or vice versa. As will be understood by those conversant in the art, a true signal on the command line 14 will cause the reader to cycle whereby during the cycle code signal patterns will be issued to output lines 15 and the record will be indexed.

The speed of the discs will be determined by the interval that code signal patterns are issued to output lines 15; the disc speeds being such that they make a complete revolution during the interval that code signal patterns are on lines 15.

Assuming a 5–8 code conversion is desired, disc A as illustrated will have 5 bit code patterns 4 representative of all the 5 bit system characters prerecorded therein and disc B the corresponding 8 bit hole patterns 8 prerecorded therein.

The reader output lines 15 are connected to a comparator 16 as are the output lines 17 of AND gates 18. One leg of each of the AND gates is connected to an associated light responsive cell output line 19 of the transducer assembly 11 and the other legs of the AND gates 18 are connected to the output of an OR gate 20 adapted to pass, as will hereinafter appear, a true signal only during the interval Figures codes are being sensed or only during intervals that Letters codes are being sensed. Accordingly, if the reader issues to lines 15 an upper case character representative code as determined by an issued preceding Figures code, when the transducer assembly 11 senses the identical code pattern in the Figures sector 6 of disc A a true signal will be generated on the output line 21 of the comparator.

To determine which code signal patterns are to be compared i.e. first system Figures or Letters codes, the reader output lines 15 are connected to a Letters code detector 22 and a Figures code detector 23 which recognize these codes and generate a true signal on their output lines which are connected respectively to the set and reset terminals of a case memory flip flop 24 whereby the leading edge of a Letters signal will set the flip flop and the leading edge of a subsequent Figures signal will reset the flip flop. The two outputs of the flip flop are connected respectively to a Letters and a Figures AND gate 25 and 26 whereby if the flip flop is set the output to the Figures AND gate will be false and the output to the Letters AND gate will be true; the opposite obtaining when the flip flop is in reset state. The output line 19P of the precedence track detecting cell of the transducer assembly is connected directly to the Figures AND gate 26 and indirectly through an inverter I to the Letters AND gate 25.

If the flip flop 24 is in an assumed Letters or set state, the Letters AND gate output will be true over the interval of time during which no openings in the precedence track 5 are being detected by the precedence detector cell of assembly 11. Similarly if the flip flop 24 is in an assumed Figures or reset state, the Figures AND gate output will be true over the interval of time during which openings in the precedence track 5 are being detected. The outputs of the case AND gates 25 and 26 are connected to the OR circuit 20 whose output, as hereinbefore noted, conditions AND gates 18 to pass bit signal patterns on lines 19 to the comparator for comparison with code signal patterns on the reader output lines 15.

In view of the above it will be apparent that if the first code issued by the reader is a Letters code the flip flop will, if not already in a set state, switch to set state. Accordingly, the Letters gate 25 will be conditioned to pass a Letters precedence signal and the Figures gate 26 will be blocked to Figures precedence signals. Letters precedence will be generated when no openings are detected in the precedence track 5 and Figures precedence signals when openings are detected. Only signal patterns of codes in the Letters sector of the disc A therefore will be permitted to pass AND gates 18 for comparison with the code signal patterns to be converted; gates 18 being blocked to signal patterns of codes in the Figures sector 6 as both AND gates 25 and 26 will be blocked over the interval codes in sector 6 are passing the transducer assembly 11.

The output line of the comparator is connected to one leg of each of eight AND gates 27. The other legs of the AND gates are connected to associated light responsive cell output lines 28 of the transducer assembly 12 whereby the code signal pattern detected by the transducer assembly 12 is passed through gates 27 during the coincidence interval to bit flip flops in a buffer storage unit 29 thereby storing the 8 bit code pattern 8 corresponding to the 5 bit input code pattern. The bit output lines 30 of the buffer storage unit are connected to an OR gate 31 whose output line 32 is connected to one of three inputs to a second OR gate 33. The output of OR gate 33 is connected to the trigger terminal of a one shot multivibrator 34 which responds to the trailing edge of a true signal passed by OR gate 33. The output signal derived over the active interval of the multivibrator, which might be incorporated in the reader unit logic, is connected to the reader command line 14 and its duration need only be sufficient to assure the initiation of a reader cycle, e.g. an interval at least equivalent to the pull in time of a cycle clutch magnet. The trailing edge of the true signal passed by gates 31 and 33 coincides with the resetting of the buffer unit whereby the reader is cycled only after data in the buffers has been processed as will hereinafter appear.

The buffer output lines 30 are also connected to associated legs of AND gates 35 whose other legs are connected to the output line 36 of a single shot precedence delay multivibrator 37. The multivibrator 37 is normally in an inactive or quiescent state such that its output line 36 supplies a true signal to all of the gates 35 with the result that the output lines 38 of those gates corresponding to the bit signal pattern in the buffer unit carry signals via OR gates 39 to the input lines 41 of a conventional record perforating unit generally designated by reference 42. The record perforating unit is one which will reproduce the code pattern on lines 41 in a tape in response to a start process or cycle initiating clutch signal on a command line 43. The leading edge of the command signal may be employed to trigger a one shot delay multivibrator within the punch logic which will remain in active state over an interval sufficient to assure the initiation of a punch cycle, e.g. an interval at least equivalent to the pull in time of a cycle clutch magnet. The command line 43 is connected to the output of an OR gate 44 having all 8 code lines 41 connected as inputs thereto, so that if any bit is present on lines 41 a process signal will pass the OR gate 44.

The output lines 38 of AND gates 35 are also connected to an OR gate 45 whose output is connected to a single shot process delay multivibrator 46 whose output is connected to the reset line 47 of the buffer 29. The delay provided by multivibrator 46 is to assure sufficient time for the punch unit to record the code signal pattern before the buffers are reset and consequently before the reader emits a subsequent code in response to the resetting of the buffer.

In order that second system precedence codes may be reproduced the invention provides a case condition flip flop 49 and upper and lower case detectors in the form of AND gates 51 and 52 respectively. Each case detector gate has three inputs all of which must be true to gate a signal to the gate output lines 53 and 54. The comparator output line 21 is connected to one input of each of the AND gates 51 and 52 and the output line 55 of the precedence track detector cell in the transducer assembly 12 is connected to one input of the upper case gate 51 and after inversion in an inverter 56 to one of the inputs of the lower case gate 52. The third input of the upper case gate 51 is connected to one of the output lines 57 of the case condition flip flop 49 and the third input of the lower case gate 52 is connected to the other output line 58 of the case condition flip flop. The normal state, i.e. lower case state, of the case condition flip flop 49 is such that output line 57 is normally true and output line 58 is normally false. The output 53 of the upper case AND gate 51 is connected to the set line 61 of the case condition flip flop which is adapted to respond to the trailing edge of the signal passed by the upper case AND gate 51 and switch to upper case state. The output of the upper case AND gate 51 is also connected, as is the output of the lower case AND gate 52, to the input of an OR gate 62 whose output is connected to the input line 63 of the single shot multivibrator 37. Also the upper and lower case AND gate output lines 53 and 54 are connected via OR gates 39 to selected input lines 41 of the record perforator 42 to set up upper and lower case patterns for reproduction in the punch unit. Finally the output line 54 of the lower case AND gate 52 is also connected to the reset line 64 of the case condition flip flop 49 which is adapted to respond to the trailing edge of the signal passed by the lower case AND gate 52 and switch to lower case state.

The operation of the described converter may be more fully understood with reference to FIGURES 1 and 2. In FIGURE 2 curve 66 represents the output of multivibrator 34; curve 67 represents the reader cycle times; curve 68 represents the output of the transducer assemblies; curve 69 represents the output of the comparator; curve 71 represents the buffer unit output; curve 72 represents the process delay multivibrator output; curve 73 represents the punch cycle times; curve 74 represents the precedence delay multivibrator output; and curve 75 represents the case condition flip flop states.

With the discs rotating, the reader may be initially cycled by momentarily closing and opening a switch 65 thereby applying a true signal to gate 33. The trailing edge of the gate output signal will trigger multivibrator 34 thereby to generate a reader command signal 76 at time $t_1$ (curve 66). After an interval sufficient to enable the energization of a clutch magnet the reader will begin a sense-feed cycle at time $t_2$ as illustrated by curve 67. During the sense interval T of the reader cycle the discs will have made one complete revolution whereby over intervals $1/T$ each of the disc codes in the Figures or Letters sectors, as the case may be as determined by the last precedence code issued by the reader as hereinbefore explained, will have been sensed and compared with the code generated by the reader over the reader sense interval T. Accordingly, a coincidence signal 77 (curve 69) will be generated sometime e.g. $t_3$ during the sensing interval T of the reader whereby AND gates 27 will be conditioned thereby to gate the code signal pattern sensed from disc B to the buffer unit 29 which will be set simultaneously with the coincidence signal at time $t_3$ as illustrated by curve 71.

With the case condition flip flop 49 in an assumed normal lower case state, if the code issued by the reader and stored in the buffers is a lower case code on disc B, neither of the AND gates 51 or 52 will pass a signal as the input line of the upper case AND gate 51 which is connected to the precedence track responsive cell of the transducer assembly 12 will not be true, nor will the input line of the lower case AND gate 52 connected to the output line 58 of the case condition flip flop be true. As neither AND gate 51 or 52 passes a signal, the delay multivibrator 37 will not be activated; consequently the AND gates 35 will be conditioned to and will pass the bit signal pattern in the buffers to lines 41 at time $t_3$ also, thereby setting up punch magnets. The perforator unit, in response to the signal from OR gate 44, also generated at $t_3$, will initiate a punch cycle at time $t_4$ whereby the code pattern sensed from disc 11 will be recorded in and a record indexed over the interval $t_4$–$t_5$. As hereinbefore noted the buffers will be reset after a delay initiated by delay multivibrator 46 which is triggered at time $t_3$ by the output from OR gate 45 resulting from passage of bit signals through AND gates 35; the delay being provided to give the record perforator sufficient time to reproduce the data and index the record tape. As shown in FIGURE 2, curve 72, the delay multivibrator remains active until the end of the punch cycle. As hereinbefore noted entry of any bit into storage will generate a signal at the output of OR gate 31 for as long as the buffer unit remains set and when the buffers are reset at time $t_5$ the trailing edge of the signal output of OR gate 31 will trigger the multivibrator 34 at time $t_5$ thereby to initiate another reader cycle at a time $t_6$.

If the next code resulting in coincidence illustrated as occurring at time $t_7$ is an upper case code on disc B all of the inputs to the upper case AND gate 51 will be true and the output thereof will via OR gate 62 trigger the delay multivibrator 37 at time $t_7$ to block AND gates 35 thereby to prevent passage of the signal pattern in the buffers for an interval sufficient for an upper case code to be reproduced. This delay interval may also last until the end of the punch cycle time. Reprduction of the precedence code is accomplished by connecting the upper case AND gate output line 53 selectively to those bit lines 41 which define the upper case precedence code pattern. This sets up the punch magnets and initiates via OR gate 44 a punch cycle over the interval $t_9$–$t_{10}$. When delay multivibrator 37 returns to quiescent state at the end of the punch cycle time, AND gates 35 will then pass the stored bit signal pattern causing multivibrator 46 to be triggered at time $t_{10}$ and the perforating unit to be recycled at time $t_{11}$, thereby to reproduce the second system code stored in the buffers. It being noted that during the punching of a second system precedence code, since AND gates 35 are blocked, the delay multivibrator 46 will not be activated until they open. Accordingly, the buffer will remain set over the active intervals of multivibrators 37 and 46. At the end of the period of multivibrator 46, the trailing edge of the signal at the output of OR gate 31 will trigger multivibrator 34 at time $t_{12}$, etc. Since the case condition flip flop 49 will have been set by the trailing edge of the upper case AND gate output signal, i.e. time $t_8$, both gates will be blocked if the next coincident code is another upper case code on disc 11 with the result that it will be reproduced immediately.

If however the next coincident code is a lower case code on disc B, all the inputs to the lower case AND gate 52 will be true and the output signal therefrom trigger the delay multivibrator 37 and energize selected bit lines 41 defining the lower case precedence pattern, which will be reproduced after which the disc B code in the buffers will be reproduced as before, etc.

When a blank code is emitted by the reader, no blank code being prerecorded on disc A, it is detected by a blank detector 78 also connected to lines 15 whose output line 79 is connected to OR circuit 44. This will cycle the record perforating unit which, since no code pattern is on lines 41, will simply index tape. The output of the blank detector is also connected to an OR gate 81 whose output line 82 is connected via OR gate 33 whereby the trailing edge of the blank detector true signal will cause the multivibrator 34 to be triggered. As noted hereinbefore the output signal of the multivibrator 34 will initiate another reader cycle.

If a 5 level upper or lower case precedence code is issued by the reader, no corresponding codes being recorded on disc 10, they are detected in associated detectors 22 and 23 as hereinbefore noted and whose outputs are also ORed in OR gate 81 thereby to effect a subsequent reader cycle.

While disc records have been disclosed specifically herein with codes represented by perforations, it is to be understood that any endless record such as a tape loop may be employed and that codes may be recorded by means other than by perforating.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. Apparatus for converting code patterns of a first system into corresponding code patterns of a second system wherein code patterns in each system may be employed twice to represent upper and lower case information, said dual meaning code patterns being distinguishable by lower and upper case precedence code patterns designating that the code patterns following a precedence code pattern represent lower or upper case information, and wherein information assigned to upper and lower case is likely to differ from system to system comprising
- a first disc having serially recorded therein on radial lines first system code patterns,
- a second disc having serially recorded therein on radial lines all of the corresponding ones of second system code patterns, each of said radial lines including the case designator of the information represented by the code pattern, the code patterns in said first and second discs representing corresponding information being orientated at the same angular positions with respect to a reference on each of said discs,
- a continuously driven shaft,
- means mounting said discs with said references in alignment on said shaft,
- first and second transducer means associated respectively with said first and second discs,
- said transducer means being positioned to simultaneously read corresponding code patterns and case designators as the discs are driven, thereby generating code signal patterns and case designator signals,
- a source operative to issue first system code signal patterns,
- comparator means for generating a gate signal upon coincidence of first system code signal patterns generated by said first transducer means and code signal patterns issuing from said source,
- second system code signal pattern storage means,
- first gate means conditioned by said gate signal to pass the second system code signal pattern generated by said second transducer means over the interval of coincidence to said storage means,
- recording means,
- and circuit means operable in response to the simultaneous application of said gate signal and to a case designator signal generated during the coincidence interval by said second transducer means to gate said stored code signal pattern to said recording means if the case designator signal generated is the same as that generated during the previous coincidence interval, said circuit means being operable to generate a case precedence code signal pattern for recording prior to gating said stored code signal pattern to said recording means when the case designator signal generated by said second transducer means differs from that generated during the previous coincidence interval.

2. Apparatus for converting code patterns of a first system into corresponding code patterns of a second system wherein code patterns in each system may be employed twice to represent upper and lower case information, said dual meaning code patterns being distinguishable by lower and upper case precedence code patterns designating that the code patterns following a precedence code pattern represent lower or upper case information, and wherein information assigned to upper and lower case is likely to differ from system to system comprising
- a first disc having serially recorded therein on radial lines first system code patterns, each of said radial lines including the case designator of the information represented by the code signal pattern,
- a second disc having serially recorded therein on radial lines all of the corresponding ones of second system code patterns, the code patterns in said first and second discs representing corresponding information being oriented at the same angular positions with respect to a reference on each of said discs,
- a continuously driven shaft,
- means mounting said discs with said reference in alignment on said shaft,
- first and second transducer means associated respectively with said first and second discs, said transducer means being positioned to simultaneously read corresponding code patterns and case designators as the discs are driven, thereby generating code signal patterns and designator signals,
- a source operative to issue first system code signal patterns,
- detectors responsive to source issued blank and precedence code signal patterns to cause said source to issue a subsequent code signal pattern,
- a comparator operative to generate an output signal over the interval of coincidence of source issued code signal patterns and code signal patterns generated by said first transducer means,
- circuit means conditioned by source issued upper and lower case precedence code signal patterns and responsive thereafter to case designator signals generated by said first transducer means to gate to said comparator only first system code signal patterns whose case designator corresponds to the last source issued precedence code signal pattern,
- a recorder,
- and gate means responsive to said output signal for passing code signal patterns generated by said second transducer means during the coincidence interval to said recorder.

3. Apparatus for converting code patterns of a first system into corresponding code patterns of a second system wherein code patterns in each system may be employed twice to represent upper and lower case information, said dual meaning code patterns being distinguishable by lower and upper case precedence code patterns designating that code patterns following a precedence code pattern represent lower or upper case information, and wherein information assigned to upper and lower case is likely to differ from system to system comprising a first disc having serially recorded therein on radial lines first system code patterns, a second disc having serially recorded therein on radial lines all of the corresponding ones of second system code patterns, each of said radial lines including the case designator of the information represented by the code pattern, the code patterns in said first and second discs representing the same information being orientated at the same angular positions with respect to a reference on each of said discs, a continuously driven shaft, means mounting said discs with said reference in alignment on said shaft, first and second transducer means associated with said first and second discs respectively, said transducer means being positioned to simultaneously read corresponding code patterns and associated case designators as the discs are driven, thereby generating code signal patterns and case designator signals, a source operative to issue first system code signal patterns, a comparator operable to generate an output signal over the interval of coincidence of source issued code signal patterns and code signal patterns generated by said first transducer means, first circuit means connecting first system code signal patterns generated by said first transducer means and said code signal patterns issuing from said source to said comparator, a recorder, gate means enabled in response to said comparator output signal to gate to said recorder the second system code signal pattern generated by said second transducer means over the interval of coincidence, and second circuit means responsive to case designator signals generated by said second transducer means for passing the gated second system code signal pattern to said recorder if the case designator signal generated during a coincidence interval is the same as the case designator signal generated in the previous coincidence interval, and for delaying the recording of said gated second system code signal pattern and generating precedence code signal patterns for recording during the delay period when the case designator signal generated during a coincidence interval differs from that generated in the preceding coincidence interval.

4. Apparatus in accordance with claim 3 wherein said second circuit comprises a buffer unit for storing code signal patterns passed by said gate means, second gate means normally conditioned to pass stored code signal patterns to said recorder, first delay means responsive to signals passed by said second gate means for resetting said buffer unit after an interval sufficient to record code signal patterns passed by said second gate means, third circuit means operative in response to said output signal to pass an upper or a lower case designator signal only when the case designator signal generated by said second transducer means during a coincidence interval differs from that generated in a previous coincidence interval, second delay means responsive to either a lower or an upper case designator signal passed by said third circuit means for blocking said second gate means over an interval necessary to generate and record a case precedence code signal pattern, and means responsive to said lower and upper case designator signals passed by said third circuit means for generating a corresponding precedence code signal pattern.

5. Apparatus in accordance with claim 4 further including means operative on said source in response to the resetting of said buffer to cause another first system code signal pattern to issue therefrom.

6. Apparatus as recited in claim 3 wherein said first circuit means includes detectors operative in response to source issued lower and upper case precedence and blank code signal patterns to cause said source to issue a subsequent code signal pattern.

7. Apparatus as recited in claim 6 wherein each of the radial lines on said first disc includes the case designator of the information represented by the code pattern on said radial lines, and wherein said first circuit means is conditionable by source issued upper and lower case precedence code signal patterns and responsive thereafter to case designator signals generated by said first transducer means to gate to said comparator only first system code signal patterns whose case designator corresponds to the last source issued precedence code signal pattern.

8. Apparatus in accordance with claim 7 wherein said third circuit means comprises upper and lower case gates operable when conditioned to pass upper and lower case designator signals, and a bistable circuit operable from lower to upper case state and from upper to lower case state in response to upper and lower case designator signals passed by said upper and lower case gates respectively, said upper case gate being conditioned when said bistable circuit is in lower case state and being operable during a coincidence interval in response to an upper case designator signal, said lower case gate being conditioned when said bistable circuit is in upper case state and being operable during a coincidence interval in response to a lower case designator signal.

References Cited by the Examiner

UNITED STATES PATENTS 3,201,782 8/1965 Von Kummer -------- 340—347

DARYL W. COOK, *Acting Primary Examiner.*

MAYNARD R. WILBURN, *Examiner.*

W. J. ATKINS, A. L. NEWMAN, *Assistant Examiners.*